C. Williams,
Journal Bearing.

N° 41,563. Patented Feb. 9, 1864.

Witnesses:
J W Coombs
Geo. W. Reed

Inventor:
C. Williams
Attorneys

UNITED STATES PATENT OFFICE.

CHRISTOPHER WILLIAMS, OF ADRIAN, MICHIGAN.

BEARING FOR CAR-AXLES AND SHAFTING.

Specification forming part of Letters Patent No. 41,563, dated February 9, 1864.

*To all whom it may concern:*

Be it known that I, CHRISTOPHER WILLIAMS, of Adrian, in the county of Lenawee and State of Michigan, have invented a new and useful Improvement in Bearings for Car-Axles and the Shafting of Machinery; and I do hereby declare that the following is a full, clear, and exact description of the same, reference being had to the accompanying drawings, making a part of this specification, in which—

Figure 2:
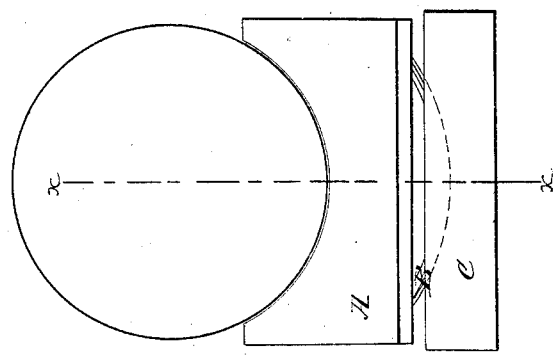
Figure 1:
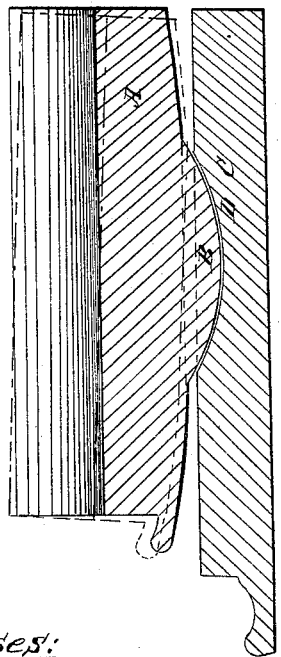
Figure 3:
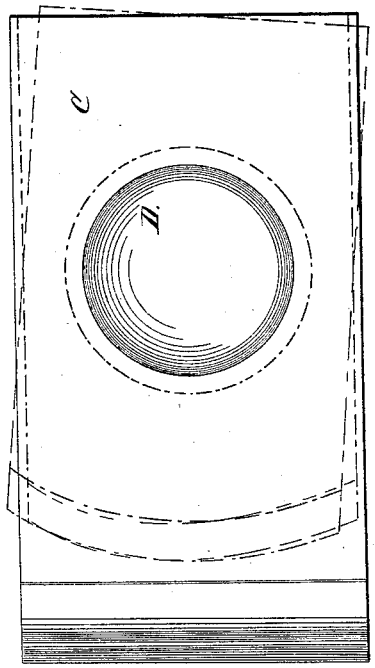

Figure 1 is a longitudinal vertical section of my invention, taken in the line $x$ $x$, Fig. 2; Fig. 2, an end view of the same; Fig. 3, a face view or plan of the female portion of the bearing.

Similar letters of reference indicate corresponding parts in the several figures.

This invention consists in constructing the bearing of two parts, one of which is provided with a projection in the form of a portion of a sphere and the other part provided with a corresponding cavity to receive said projection, whereby the bearing is made or allowed to adjust itself to the shaft in case the latter assumes an inclined or an oblique position.

The invention is especially applicable to railroad-car trucks, which, in consequence of being frequently strained, have their axles more or less inclined, which contingency, with the ordinary bearings, causes the journals to heat. The bearings of any shafting frequently wear unevenly, in which case the journals are sure to heat with the ordinary bearings, a difficulty which is fully obviated by my invention.

To enable those skilled in the art to fully understand and construct my invention, I will proceed to describe it.

A represents a portion of the bearing which receives the journal of the axle or shaft. The outer or inner side of this portion or part A is made of curved form longitudinally, as shown in Fig. 1, and is provided with a projection, B, which is a section or portion of a sphere.

C represents the other portion or part of the bearing, which has parallel surfaces and is provided with a recess, D, corresponding in form to the projection B of the part A of the bearing, so that it may receive the same when the two parts A C are fitted together, as shown in Fig. 1. By this arrangement it will be seen that the two parts A C of the bearing may turn in any direction and adjust themselves to the shaft whether the latter assume an inclined or an oblique position. This will be fully understood by referring to Figs. 1 and 3, the former showing in red an inclined position of the part A of the bearing, and the latter showing in dotted red lines a diagonal position of the same.

Thus by this simple means the bearing is allowed to adjust itself to the axle or shaft in any position the latter may assume by the straining, warping, or settling of the parts in which the axle or shaft is placed, or by the unequal wearing of the bearings of the axle or shaft, and the heating of the journals thereby prevented, as well as much wear of the journals and bearings.

Having thus described my invention, what I claim as new, and desire to secure by Letters Patent, is—

A bearing for car-axles and the shafting of machinery generally, composed of two parts, A C, one of which is provided with a projection, B, in the form of a section of a sphere, and the other provided with a corresponding recess, D, to receive the projection B, substantially as and for the purpose herein set forth.

CHRISTOPHER WILLIAMS.

Witnesses:
C. F. HUNTER,
C. L. HUNTER.